US008321586B2

(12) United States Patent
Matsuo

(10) Patent No.: US 8,321,586 B2
(45) Date of Patent: Nov. 27, 2012

(54) DISTRIBUTED STORAGE SYSTEM, NODE DEVICE, RECORDING MEDIUM IN WHICH NODE PROCESSING PROGRAM IS RECORDED, AND ADDRESS INFORMATION CHANGE NOTIFYING METHOD

(75) Inventor: Hideki Matsuo, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 448 days.

(21) Appl. No.: 12/458,638

(22) Filed: Jul. 17, 2009

(65) Prior Publication Data

US 2010/0023593 A1    Jan. 28, 2010

(30) Foreign Application Priority Data

Jul. 22, 2008   (JP) .................................. 2008-188825

(51) Int. Cl.
*G06F 15/173* (2006.01)
(52) U.S. Cl. ................... 709/238; 709/207; 709/245
(58) Field of Classification Search ................... 709/219
See application file for complete search history.

(56) References Cited

U.S. PATENT DOCUMENTS

| 7,555,527 B1 * | 6/2009 | Slaughter et al. ............. 709/213 |
| 7,698,414 B1 * | 4/2010 | Shelat et al. .................. 709/224 |
| 2004/0054807 A1 * | 3/2004 | Harvey et al. ................. 709/243 |
| 2007/0002869 A1 * | 1/2007 | Miller ...................... 370/395.32 |
| 2007/0283043 A1 * | 12/2007 | Kiyohara et al. .............. 709/243 |
| 2008/0027898 A1 * | 1/2008 | Matsuo et al. ..................... 707/1 |
| 2008/0288654 A1 * | 11/2008 | Matuszewski et al. ........ 709/238 |
| 2009/0037445 A1 * | 2/2009 | Ushiyama ..................... 707/100 |

FOREIGN PATENT DOCUMENTS

| EP | 1 802 070 B1 | 6/2007 |
| JP | A-2006-197400 | 7/2006 |
| JP | A-2007-174672 | 7/2007 |
| WO | WO 2008/142511 A2 | 11/2008 |

OTHER PUBLICATIONS

Office Action issued in Japanese Application No. 2008-188825 dated May 14, 2012 (with translation).

* cited by examiner

*Primary Examiner* — Firmin Backer
*Assistant Examiner* — Natisha Cox
(74) *Attorney, Agent, or Firm* — Oliff & Berridge, PLC

(57) ABSTRACT

In a transmitting node device, a first storing device stores address information and node identification information of a plurality of first specific node devices, a detecting device detects a change in address information of the transmitting node device, a first selecting device selects at least one node device from the first specific node devices, and a notifying device transmits an address change notification message to the node device selected by the first selecting device.
In a receiving node device which receives the address change notification message, a second storing device stores address information and node identification information of a plurality of the second specific node devices, and an updating device updates the address information stored in the second storing device with the address information included in the received message.

10 Claims, 11 Drawing Sheets

FIG. 2

ROUTING TABLE USING DHT OF NODE N2

| | 0XX AREA<br>NODE ID:002 | 1XX AREA<br>NODE ID:122 | 2XX AREA<br>NODE ID:221 | 3XX AREA<br>NODE ID:301 |
|---|---|---|---|---|
| LEVEL 1 | IP ADDRESS AND PORT NUMBER OF NODE N3 | IP ADDRESS AND PORT NUMBER OF NODE N2 | IP ADDRESS AND PORT NUMBER OF NODE N21 | IP ADDRESS AND PORT NUMBER OF NODE N31 |
| | 10X AREA<br>NODE ID:102 | 11X AREA<br>NODE ID:112 | 12X AREA<br>NODE ID:122 | 13X AREA<br>NODE ID:131 |
| LEVEL 2 | IP ADDRESS AND PORT NUMBER OF NODE N25 | IP ADDRESS AND PORT NUMBER OF NODE N28 | IP ADDRESS AND PORT NUMBER OF NODE N2 | IP ADDRESS AND PORT NUMBER OF NODE N35 |
| | NODE ID:120 | NODE ID:121 | NODE ID:122 | |
| LEVEL 3 | IP ADDRESS AND PORT NUMBER OF NODE N22 | IP ADDRESS AND PORT NUMBER OF NODE N32 | IP ADDRESS AND PORT NUMBER OF NODE N2 | (UNREGISTERED) |

ID SPACE OF DHT

EXAMPLE 1

EXAMPLE 2

EXAMPLE 3

EXAMPLE 4

EXAMPLE 5

DISTRIBUTED STORAGE SYSTEM, NODE DEVICE, RECORDING MEDIUM IN WHICH NODE PROCESSING PROGRAM IS RECORDED, AND ADDRESS INFORMATION CHANGE NOTIFYING METHOD

The entire disclosure of the Japanese Patent Application No. 2008-188825, including the specification, the scope of claims, drawings, and abstract, filed on Jul. 22, 2008 is incorporated herein by reference in its entirety.

BACKGROUND OF THE INVENTION

1. Field of the Invention

The present invention relates to a technical field of a peer-to-peer (P2P) communication system having plural node devices which can communicate with each other via a network.

2. Discussion of the Related Art

In this kind of peer-to-peer communication system, a distributed storage system is conventionally known, which in a distributed manner stores (allocates) copy data (hereinbelow, called "replica") of a plural pieces of content data (content data of a movie, music, and the like) in to a plural node devices and enables replicas to be transmitted/received among the node devices to which IP (Internet Protocol) addresses are assigned. The locations of the replicas distributed and stored can be efficiently retrieved by using a distributed hash table (hereinbelow, called DHT) as disclosed in patent document 1 (Japanese Patent Application Laid-Open No. 2006-197400).

SUMMARY OF THE INVENTION

There is a case where IP addresses assigned to node devices are not fixed. For example, in the case of Internet Protocol version 4 (hereinbelow, called "IPv4") generally, an IP address is assigned by a DHCP (Dynamic Host Configuration Protocol) server. When a lease period (validity period) is set for the IP address, the IP address may be changed after the period. In the case of Internet Protocol version 6 (hereinbelow, called "IPv6"), an IP address can be assigned by stateless automatic setting of a router, even if there is no DHCP server. However, a continuous use of an IP address has a problem in light of security. Consequently, a temporary address (RFC3041) which is changed periodically is used.

However, when the IP address is changed as described above, there is the possibility that information transmission among node devices, for example, routing of a message using the DHT or the like is disturbed.

In view of the above problems and the like, an object of the present invention is to provide a distributed storage system, a node device, a recording medium in which a node processing program is recorded, and an address information change notifying method capable of preventing information transmission among node devices from being disturbed even if an IP address is changed.

In order to solve the above problem, one aspect of the invention relates to a distributed storage system formed by participation of a plurality of node devices connected to a network, in which replica data of a plurality of contents is stored in a plurality of the node devices in a distributed manner and the replica data can be transmitted and received among the node devices, wherein a transmitting node device comprises:

a first storing device configured to store address information and node identification information of a plurality of first specific node devices participating in the distributed storage system, the number of the first specific node devices being smaller than the number of all of node devices participating in the distributed storage system;

a detecting device configured to detect a change in address information of the transmitting node device;

a first selecting device configured to select at least one node device from the first specific node devices, if a change in address information is detected by the detecting device; and a notifying device configured to transmit an address change notification message to the node device selected by the first selecting device via the network, based on address information of the selected node device, the address change notification message including the changed address information and node identification information of the transmitting node device, and wherein a receiving node device, which receives the address change notification message, comprises:

a second storing device configured to store address information and node identification information of a plurality of the second specific node devices participating in the distributed storage system, the number of the second specific node devices being smaller than the number of all of node devices participating in the distributed storage system; and an updating device configured to update the address information stored in the second storing device with the address information included in the received message, if the node identification information included in the received message has been already stored in the second storing device and the address information stored in the second storing device in association with the already stored node identification information is different from the address information included in the received message.

BRIEF DESCRIPTION OF DRAWINGS

FIG. 2 is a diagram showing an example of a DHT routing table held by a node N2.

DETAILED DESCRIPTION OF THE PREFERRED EMBODIMENTS

Preferred embodiments for carrying out the present invention will be described below with reference to the drawings. The following embodiments relate to the case of applying the present invention to a distributed storage system.

1. Configuration and the Like of Distributed Storage System

First, with reference to FIG. 1 and the like, a schematic configuration and the like of a distributed storage system as an embodiment of the present invention will be described.

Figure 1:
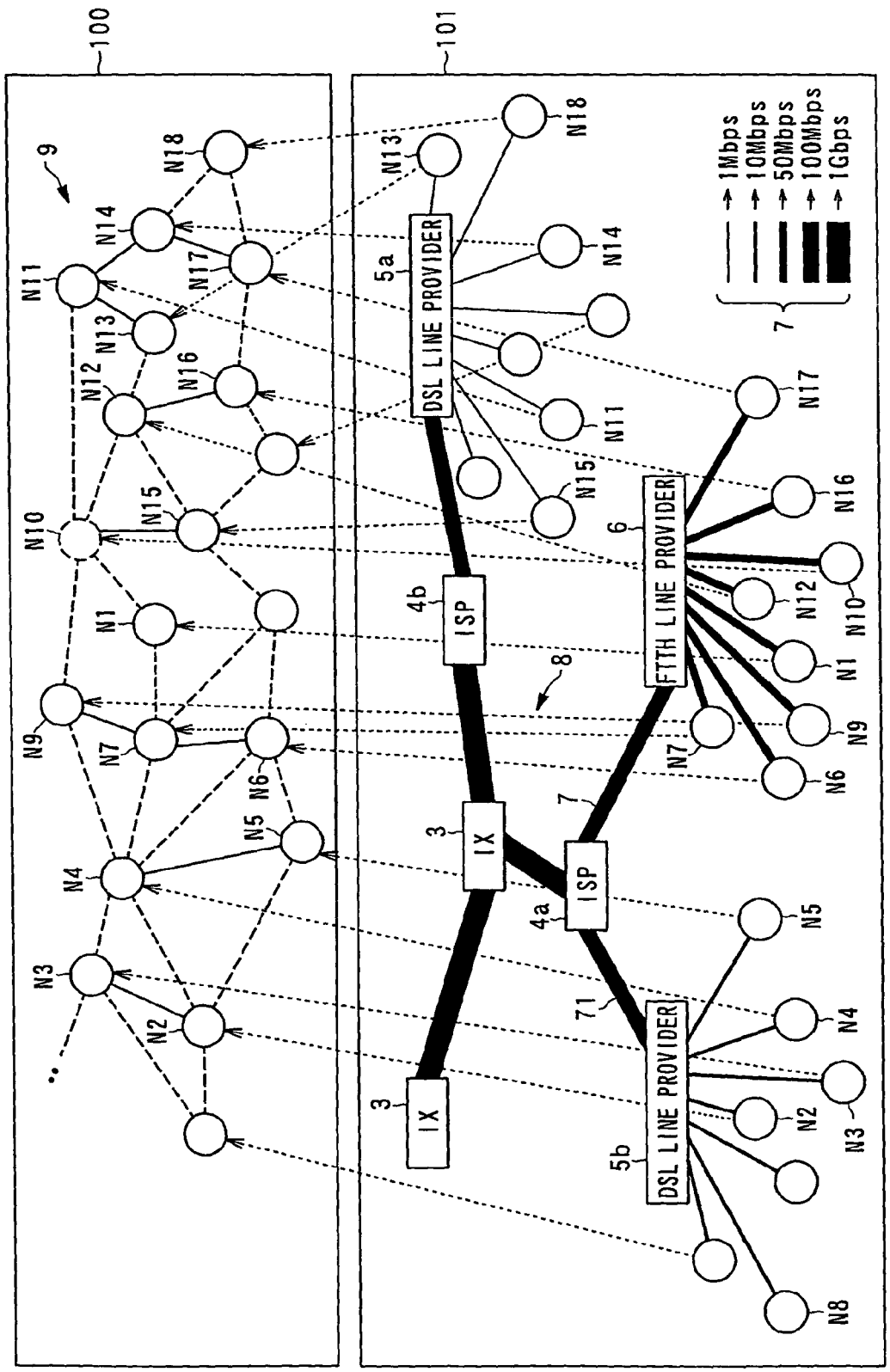
FIG. 1 is a diagram showing an example of a connection mode of the respective node devices in a distributed storage system according to an embodiment of the present invention.

FIG. 1 is a diagram showing an example of a connection mode of node devices in the distributed storage system in the embodiment of the present invention.

As shown in a lower frame 101 in FIG. 1, a network (a communication network in the real world) 8 such as the Internet is constructed by IXs (Internet eXchanges) 3, ISPs (Internet Service Providers) 4a and 4b, (apparatuses of) DSL (Digital Subscriber Line) providers 5a and 5b, (an apparatus of) an FTTH (Fiber To The Home) provider 6, communication lines (for example, telephone lines, optical cables, and the like) 7, and so on. Although routers for transferring data (packets) are properly inserted in the network (communication network) 8 in the example of FIG. 1, they are not shown in the diagram.

To such a network 8, a plural node devices (hereinbelow, called "nodes") Nn (n=any of 1, 2, 3, . . . ) are connected via the router. To each of the nodes Nn, unique serial number and an IP (Internet Protocol) address are assigned. A distributed storage system S of the embodiment is a peer-to-peer network system formed (constructed) by participation of plural nodes Nn as shown in an upper frame 100 in FIG. 1 out of the nodes Nn.

A network 9 shown in the upper frame 100 in FIG. 1 is an overlay network 9 (logical network) constructing a virtual link formed by using the existing network 8. Such an overlay network 9 is realized by a specific algorism, for example, an algorithm using the DHT.

To each of the nodes Nn participating in the distributed storage system S (in other words, the overlay network 9), a node ID as unique node identification information made of predetermined number of digits is assigned. The node ID is, for example, a value (having a bit length of, for example, 160 bits) obtained by hashing an IP address or serial number assigned to each node Nn with a common hash function (for example, SHA-1). Node IDs are dispersedly disposed without a bias in a single ID space.

At the time of participating in the distributed storage system S, a node Nn which is not participating (for example, node N8) transmits a participation message indicative of a participation request to an arbitrary node Nn which is participating (for example, a contact node which always participates in the system S).

Each of the nodes Nn holds a routing table using a DHT (an example of a destination table, hereinbelow, called "DHT routing table"). The routing table specifies candidates of transfer destinations (destination candidates) of various messages on the distributed storage system S. Concretely, a plural pieces of node information including node ID, IP address, and port number of nodes Nn which are properly apart from each other in the ID space are registered.

In one node Nn participating in the distributed storage system S, node information of the minimum number of nodes Nn in all of nodes Nn participating in the system S (that is, nodes Nn of the number smaller than that of all of the nodes Nn participating in the system S) is registered in the routing table. The node information of a node Nn whose node information is unknown (not stored) is delivered by transferring various messages among each nodes Nn.

The DHT routing table will be described in detail with reference to FIGS. 2 and 3.

FIG. 2 is a diagram showing an example of a DHT routing table held by the node N2. FIG. 3 is a conceptual diagram showing an example of the ID space of the DHT.

Figure 3:
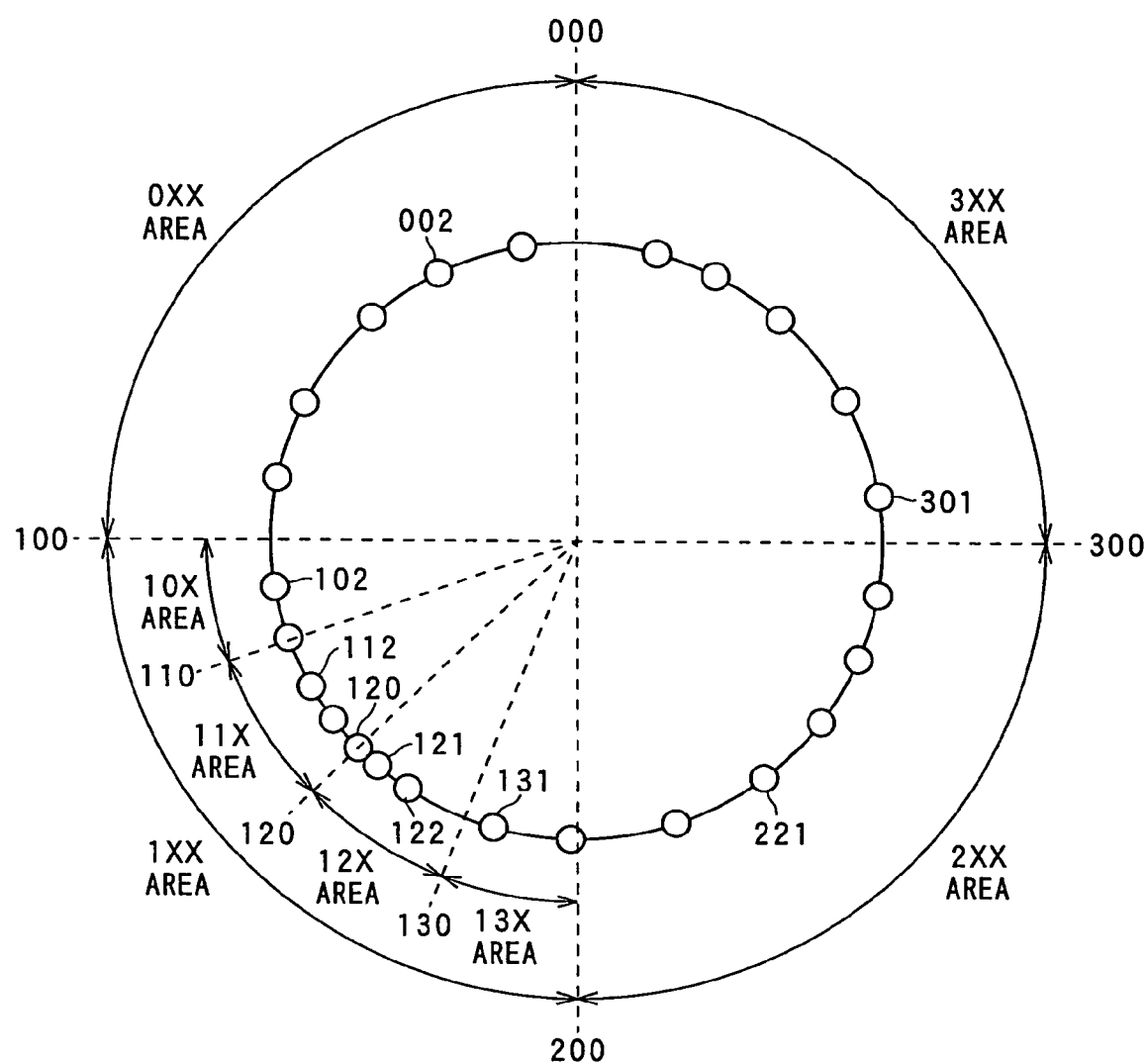
FIG. 3 is a conceptual diagram showing an example of an ID space of a DHT.

In the example of FIGS. 2 and 3, for convenience of explanation, the bit length of a node ID is 6 bits (=2 bits×3 digits), and each digit is expressed in quaternary number (an integer of 0 to 3) (in practice, longer bit length is used, and each digit is divided, for example, every four bits and is expressed in hexadecimal of 0 to f).

In the example of FIG. 2, the DHT routing table is made of a plural stages of level 1 (first stage) to level 3 (third stage). As a table entry at each level, as node information, a node ID, and an IP address and port number of a node Nn corresponding to the node ID are registered so as to be associated with each other area by area.

Specifically, the node information of each of the nodes Nn is registered in a plural stages. The highest stage is set as level 1, and level 2 and level 3 follow as stages lower than the level 1 (level 2 is a stage higher than level 3).

Each area in the table at each level is obtained by dividing the node ID space of the DHT. For example, as shown in FIG. 3, at level 1, the entire ID space of the DHT is divided into four areas. An area where node IDs "000" to "033" exist is set as an area 0XX. An area where node IDs "100" to "133" exist is set as an area 1XX. An area where node IDs "200" to "233" exist is set as an area 2XX. An area where node IDs "300" to "333" exist is set as an area 3XX. At level 2, each of the areas of level 1 (that is, areas 0XX to 3XX) is further divided into four areas. For example, the area 1XX is divided into four areas. An area where node IDs of "100" to "103" exist is set as an area 10X. An area where node IDs of "110" to "113" exist is set as an area 11X. An area where node IDs of "120" to "123" exist is set as an area 12X. An area where node IDs of "130" to "133" exist is set as an area 13X.

For example, when the node ID of the node N2 is "122", as shown in FIG. 2, in the table of the area 1XX at level 1 of the node N2 (that is, the area where the node itself exists), the node ID and the IP address of the node itself (since the ID address is of the node itself, it may not be registered in the routing table) and the like are registered. In each of areas where the node itself does not exist (that is, the areas 0XX, 2XX, and 3XX), the node ID, the IP address and the like of another arbitrary node Nn are registered.

In the table of the area 12X at level 2 of the node N2 (the area where the node itself exists), as shown in FIG. 2, the node ID and the IP address of the node itself (since the IP address is of the node itself, it may not be registered in the routing table) and the like are registered. In each of areas where the node itself does not exist (that is, the areas 10X, 11X, and 13X), the node ID, the IP address and the like of another arbitrary node Nn are registered.

Further, at level 3 of the node N2, as shown in FIG. 2, the node ID, the IP address (since the IP address is of the node itself, it may not be registered in the routing table), and the like of each of nodes whose node IDs are "120" to "122" are registered.

In the examples of FIGS. 2 and 3, the bit length of a node ID is set as "3 digits×2 bits", so that a table of three levels of level 1 to level 3 is sufficient. However, when the bit length of a node ID is increased, a table of a corresponding amount is necessary (for example, in the case of setting the bit length of a node ID to "16 digits×4 bits", a table of 16 levels is necessary).

As described above, in the DHT routing table in the embodiment, as the numerical value of a level increases, in other words, the lower the level is, the area is narrowed.

Such a DHT routing table is generated, for example, when a not-participating node participates in the distributed storage system S.

Figure 4:
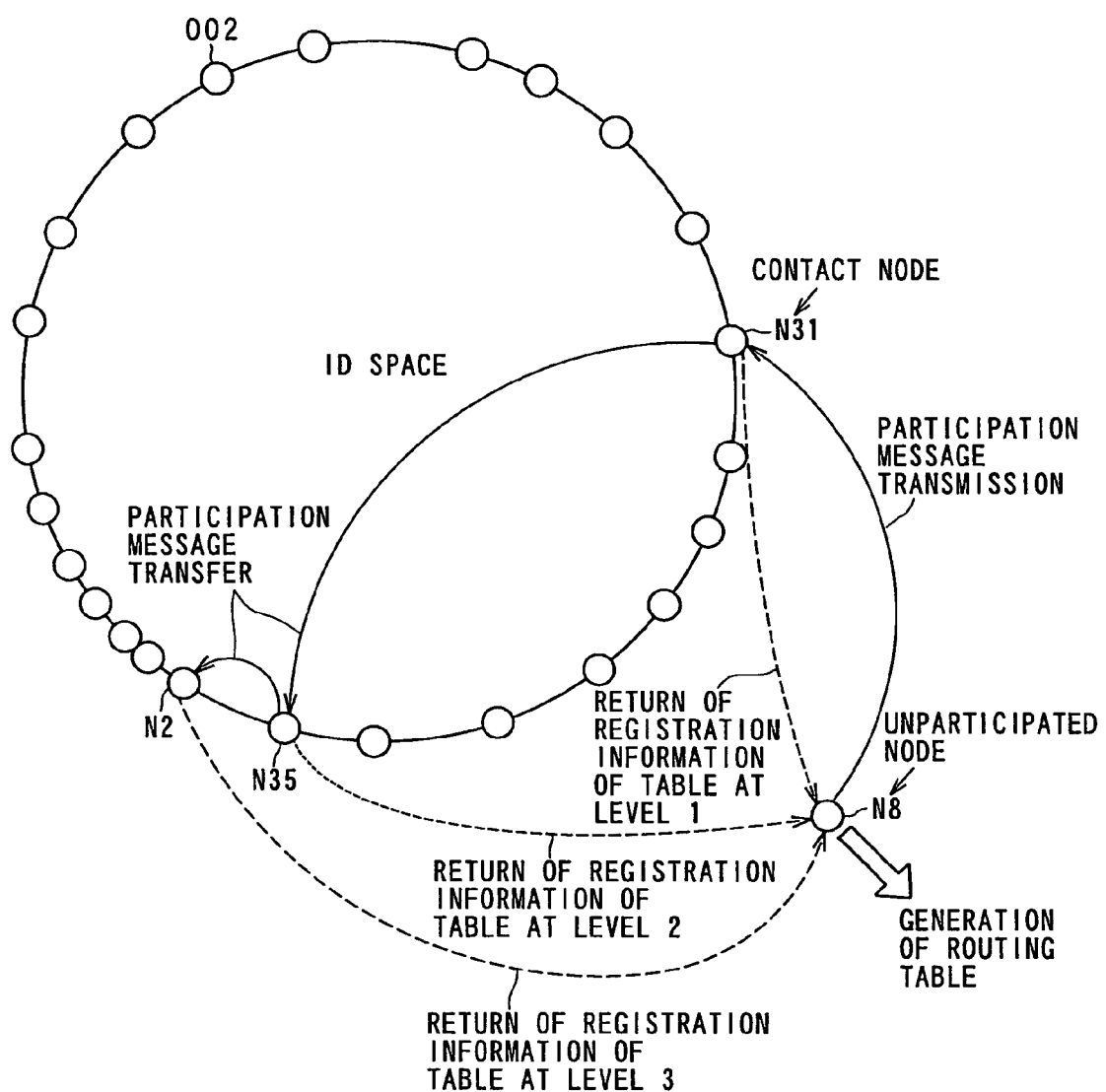
FIG. 4 is a conceptual diagram showing an example of procedure of generating a DHT routing table at the time of participation in a distributed storage system S.

With reference to FIG. 4, the procedure of generating the DHT routing table at the time of participation in the distributed storage system S.

FIG. 4 is a conceptual diagram showing an example of the procedure of generating a DHT routing table at the time of participation in the distributed storage system S.

As shown in FIG. 4, in the case where a not-participating node NB (having a node ID of, for example, "123") participates in the distributed storage system S, for example, the node N8 is connected to a contact node by using the IP address of the contact node via the network 8 and transmits a participation message (including node information of the node N8) to the contact node. The contact node which has received the participation message sends a return message including the node information and the like registered in the table of level 1 in the DHT routing table of the node itself to the node N8. Further, the contact node selects one node Nn from the DHT routing table on the basis of a result of comparison between the node ID included in the received participation message and the node ID of another node Nn registered in the DHT routing table. For example, a node N35 having a node ID closest to the node ID included in the participation message (for example, having larger number of matched higher digits) is selected from the DHT routing table, and the participation message is transferred to the node N35. In the participation message, information indicative of the stage number (level 2 in this case) of a table to be sent back next is included.

The node N35 which receives the participation message returns a return message including node information registered in the table of level 2 in the DHT routing table of the node itself to the node N8. Further, the node N35 selects one node Nn from the DHT routing table on the basis of a result of comparison between the node ID included in the received participation message and the node ID of another node Nn registered in the DHT routing table. For example, a node N2 having a node ID closest to the node ID included in the participation message (for example, having larger number of matched higher digits) is selected from the DHT routing table, and the participation message is transferred to the node N2. In the participation message, information indicative of the stage number (level 3 in this case) of a table to be sent back next is included.

The node N2 which receives the participation message returns the return message including the node information registered in the table of level 3 in the DHT routing table of the node itself to the node N8.

Thus, the participation message is transferred to the node Nn having the node ID closest to the node ID of the not-participating node N8 by the DHT routing using the node ID as a key.

The node NB generates a DHT routing table of itself by using the node information and the like included in the return message received from each of the nodes Nn. In generation of the DHT routing table, for example, node information received from a contact node is registered in table 1 of the DHT routing table of itself, node information received from the node N35 is registered in table 2 of the DHT routing table of itself, and node information received from the node N2 is registered in table 3 of the DHT routing table of itself.

In such a manner, participation of the node N8 to the distributed storage system S is completed. Since the messages are transmitted/received in a triangle shape as shown in FIG. 4, the form of such participation is called "triangle participation".

In the distributed storage system S, replicas of various different contents (such as movies and music) are stored in a predetermined file format so as to be dispersed to a plural nodes Nn. The replicas can be transmitted/received among the nodes Nn. For example, in the node N5, a replica of content of a movie whose title is XXX is stored. On the other hand, in the node N3, a replica of content of a movie whose title is Y is stored. In such a manner, replicas are stored so as to be dispersed to the plural nodes Nn (hereinbelow, called "content holding nodes").

To a replica of these contents, information such as content name (title) and content ID (content identification information unique to the content) is given. The content ID is generated by, for example, hashing "content name+arbitrary numerical value" (or a few bytes from the head of the content data) with the same hash function as that used at the time of obtaining the node ID (the content ID is disposed in the same ID space as that of the node ID). Alternatively, the system administrator may give an unconditional ID value (having the same bit length as that of the node ID) to content. In this case, content catalog information in which correspondence between content name and content ID is written is distributed to all of nodes Nn.

Index information of the locations of replicas in a distributed manner stored, that is, sets each made of node information of a node Nn storing the replica and content ID corresponding to the replica of the content is stored (stored in an index cache) by a node Nn managing the location of the replica of the content (hereinbelow, called "root node" or "root node of content data (content ID)") or the like and managed.

The node information of the content holding node that stores a replica of content is managed by the root node so as to be provided in accordance with an inquiry from another node Nn.

For example, index information of a replica of content of a movie whose title is XXX is managed by a node N4 as the root node of the content (content ID). Index information of a replica of content of a movie whose title is YYY is managed by a node N7 as the root node of the content (content ID). Such a root node is determined, for example, as a node Nn having a node ID closest to the content ID (for example, having larger number of upper digits).

In the case where the user of a certain node Nn wishes to obtain a replica of desired content, the node Nn (hereinbelow, called "user node") desiring acquisition of the replica generates a content location inquiry (retrieval) message (query) including the content ID of content selected from the content catalog information by the user, the IP address of the node itself, and the like, and transmits the message to another node Nn in accordance with a DHT routing table of the node itself. That is, the user node transmits a content location inquiry (retrieval) message toward the root node (to the address of the root node) (that is, the root node is inquired of the location of the replica of the content). The content location inquiry (retrieval) message finally reaches the root node by the DHT routing using the content ID as a key. Since the DHT routing is known in the Japanese Patent Application Laid-Open No. 2006-197400 and the like, the detailed description will not be repeated.

Attribute information of the content name, content ID, disclosure date and time, and the like of content to be selected by the user in each of nodes Nn is written in, for example, content catalog information distributed from a content providing server to all of nodes Nn. The content ID included in the content location inquiry (retrieval) message may be generated by hashing the content name with the common hash function by the user node.

The root node which receives the content location inquiry (retrieval) message obtains the index information corresponding to a content ID included in the message from the index cache, and returns the index information to the user node as the transmitter of the content location inquiry message. The user node which obtained the index information as described above is connected to the content holding node on the basis of the IP address and the like of the content holding node included in the index information, transmits the content transmission request message, and obtains (downloads) a replica of the content.

The root node transmits a content transmission request message to a content holding node expressed by the IP address or the like included in the index information. On the basis of the message, the user node can obtain a replica of the content from the content holding node. During the period in which the content location inquiry message reaches a root node, the user node can obtain the index information from a cache node in which the same index information as that of the root node is cached.

The user node which stores a replica of content obtained from the content holding node (for example, which records the replica in a hard disk) generates a published (registration-notifying) message including the content ID of the replica and the node information of the node itself to notify the root node of storage of the replica (in other words, to disclose the storage to other nodes Nn participating in the system S), and transmits the published message toward the root node (to the address of the root node).

Similarly with the content location inquiry (retrieval) message, the published message reaches the root node by the DHT routing using the content ID as a key. The root node registers index information including the set of node information and the content ID included in the received published message (stores the index information to the index cache area). In such a manner, the user node newly becomes a content holding node which holds a replica of the content.

The index information including a set of the node information and the content ID included in the published message is also registered (cached) in a cache node in a transfer path to the root node.

2. Configuration, Function, and the Like of Node Nn

The configuration and the function of the node Nn will now be described with reference to FIG. 5.

Figure 5:
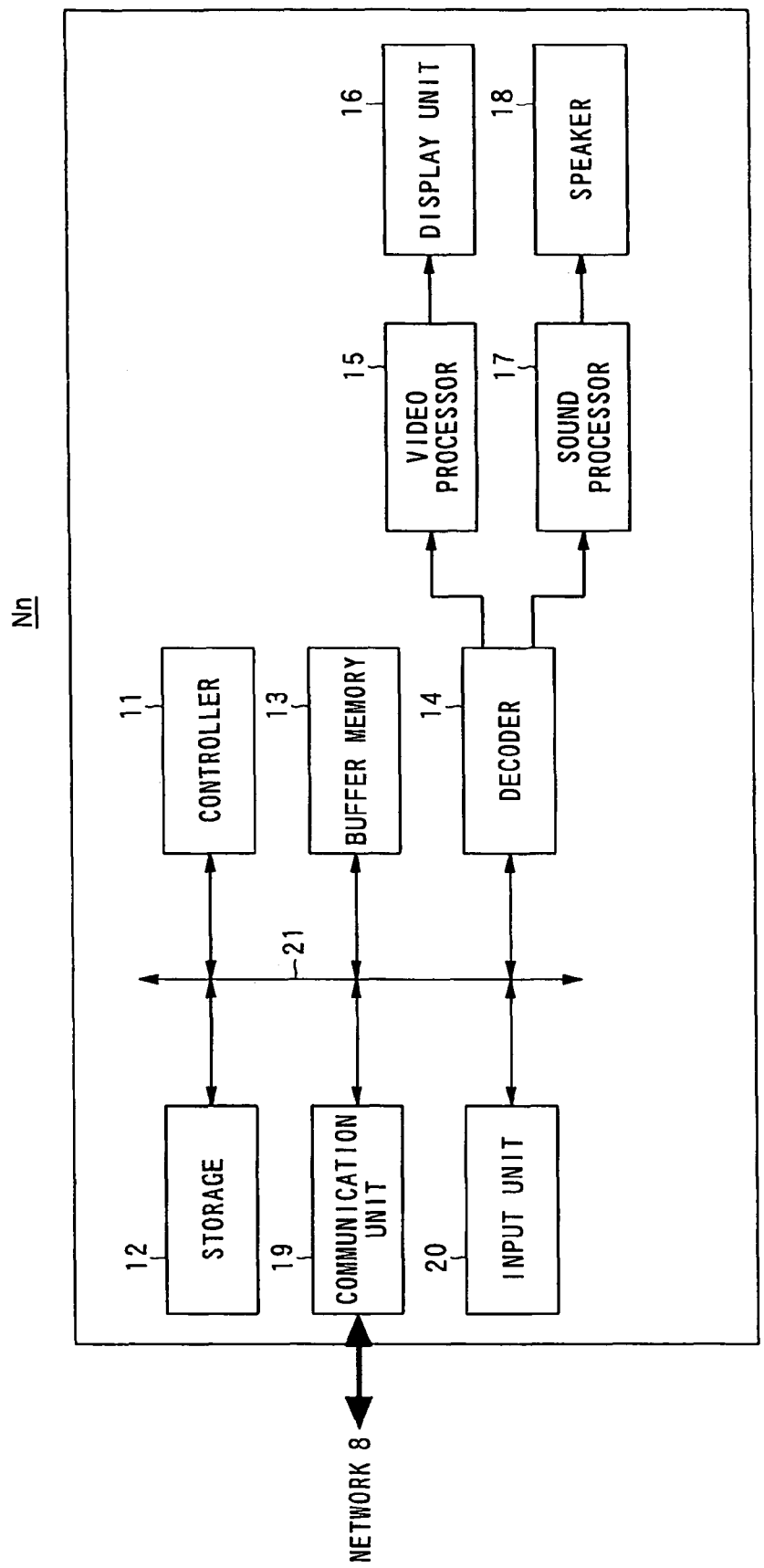
FIG. 5 is a diagram showing an example of a schematic configuration of a node Nn.

FIG. 5 is a diagram showing an example of a schematic configuration of a node Nn.

As shown in FIG. 5, each node Nn includes: a controller 11 as a computer constructed by a CPU having a computing function, a work RAM, a ROM for storing various data and programs, and the like; a storage 12 as an HD (Hard Disk) for storing various data (for example, a replica of content data, index information, a DHT routing table, node ID, the acquired IP address and the like), various programs, and the like; a buffer memory 13 for temporarily storing a replica or the like of received content data; a decoder 14 for decoding encoded video data (video information), audio data (audio information), and the like included in a replica of content data; a video processor 15 for performing a predetermined drawing process on the decoded video data and the like and outputting the resulted data as a video signal; and a display unit 16 such as a CRT display, a liquid crystal display, or the like for displaying a video image on the basis of the video signal output from the video processor 15; a sound processor 17 for D-A (digital-to-analog) converting the decoded audio data to an analog audio signal, amplifying the analog audio signal, and outputting the amplified analog audio signal; a speaker 18 for outputting the audio signal output from the sound processor 17 as sound wave; a communication unit 19 for performing communication control on information to/from another node Nn or the like via the network 8; and an input unit (such as a keyboard, a mouse, an operation panel, or the like) 20 for accepting an instruction from the user and giving an instruction signal according to the instruction to the controller 11. The controller 11, storage 12, buffer memory 13, decoder 14, communication unit 19, and input unit 20 are connected to each other via a bus 21. As the node Nn, a personal computer, an STB (Set Top Box), a TV receiver, or the like can be applied.

In the storage 12, the IP address, port number, and the like of a contact node to be accessed at the time of participating in the distributed storage system S are stored. In the storage 12, not only the node information stored in the DHT routing table and the index cache but also log information including the IP addresses of other nodes Nn which have transmitted messages to the node Nn of the storage 12 may be stored.

In such a configuration, the controller 11 controls the entire node by reading and executing a program stored in the storage 12 or the like by the CPU. By participation in the distributed storage system S, the controller 11 performs process of any one of the user node, a relay node, a root node, a cache node, and a content holding node. Further, the controller 11 functions as an address change detecting device, a node selecting device, an address change notifying device, a message transferring device, an address information updating device, and the like in the present invention.

Concretely, the controller 11 detects a change in an IP address of a node of itself. A change in the IP address can be detected, for example, when the node can be connected to another node Nn. When the node is connected to another node Nn, Controller 11 acquires a new IP address through communication unit 19 from serve or router. Controller 11 compares the acquired new IP address with the stored IP address in the past in a memory area of HD or RAM. As described above, a change in the IP address can be detected. In the case where a change in the IP address is detected, the controller 11 selects at least one of other nodes Nn in which the IP address is stored (that is, the other nodes Nn knowing the IP address) in order to notify of the change in the IP address.

The controller 11 is connected to the selected node Nn by using the IP address of the node Nn and transmits an address change notification message including the changed IP address of the node of itself and the node ID of the node to the node Nn.

By selecting, as an object to which the address change notification message is to be transmitted, for example, all of nodes Nn whose node information is registered in the DHT routing table and all of nodes Nn whose IP addresses are stored in the index cache, a change in an IP address can be notified to many nodes Nn having the possibility to transmit/receive a message to/from a node itself. If the log information is stored, by selecting all of nodes Nn whose IP addresses are included in the log information as objects to which the address change notification message is transmitted, a change in an IP address can be notified to a larger number of nodes Nn having the possibility to transmit/receive a message to/from a node itself.

When only the address change notification message is transmitted to the DHT routing table, the index cache, and the node Nn in the log information, it is difficult to notify a change in an IP address to other nodes Nn which are not grasped by the node itself. It is consequently sufficient to transfer the IP address change notification (address change notification message) in a transfer path similar to that of a published message. For example, the controller 11 transmits a published message including the content ID of a replica stored in the storage 12 of the node of itself and node information of the node (including the changed IP address and the node ID of the node) (that is, a published message including the address change notification message) toward a root node using the content ID as a key. As a result, the node Nn can also notify a cache node (a node Nn expected to store the IP address of the node Nn itself) of a change in the IP address in a transfer path of a published message to the root node.

Further, it is preferable to transfer the IP address change notification (address change notification message) in a transfer path similar to that of the participation message using the above-described triangle participation. For example, the controller 11 transmits a re-participation message including the node information of the node of itself (including the changed IP address of the node of itself and the node ID of the node of itself) toward the root node using the node ID as a key. In such a manner, a change in an IP address can be notified also to a node Nn in a transfer path through which the re-participation message reaches the root node (in the example of FIG. 4, the contact node and the node N35 in which the IP address of the node is supposed to be stored).

It is most reliable to notify a change in an IP address by transmitting the address change notification message to all of nodes Nn participating in the distributed storage system S by DHT multicast (multicast message transferring process) disclosed in Japanese Patent Application Laid-Open No. 2007-053662 as another example. On the negative side, since the address change notification message is transmitted to many nodes Nn which do not store the IP address of the node itself, it is wasteful and a load is applied to the network 8 due to increase in the traffic amount.

On the other hand, the controller 11 of the node Nn which receives an address change notification message updates, in the case where the node ID included in the received address change notification message was stored in the past (in at least one of, for example, the DHT routing table, the index cache, and log information) and an IP address stored in association with the stored node ID is different from the IP address included in the message, the stored IP address to the IP address included in the message.

3. Operation of Distributed Storage System S

The operation of the tree-shaped broadcasting system S of the embodiment will now be described.

Figure 6:
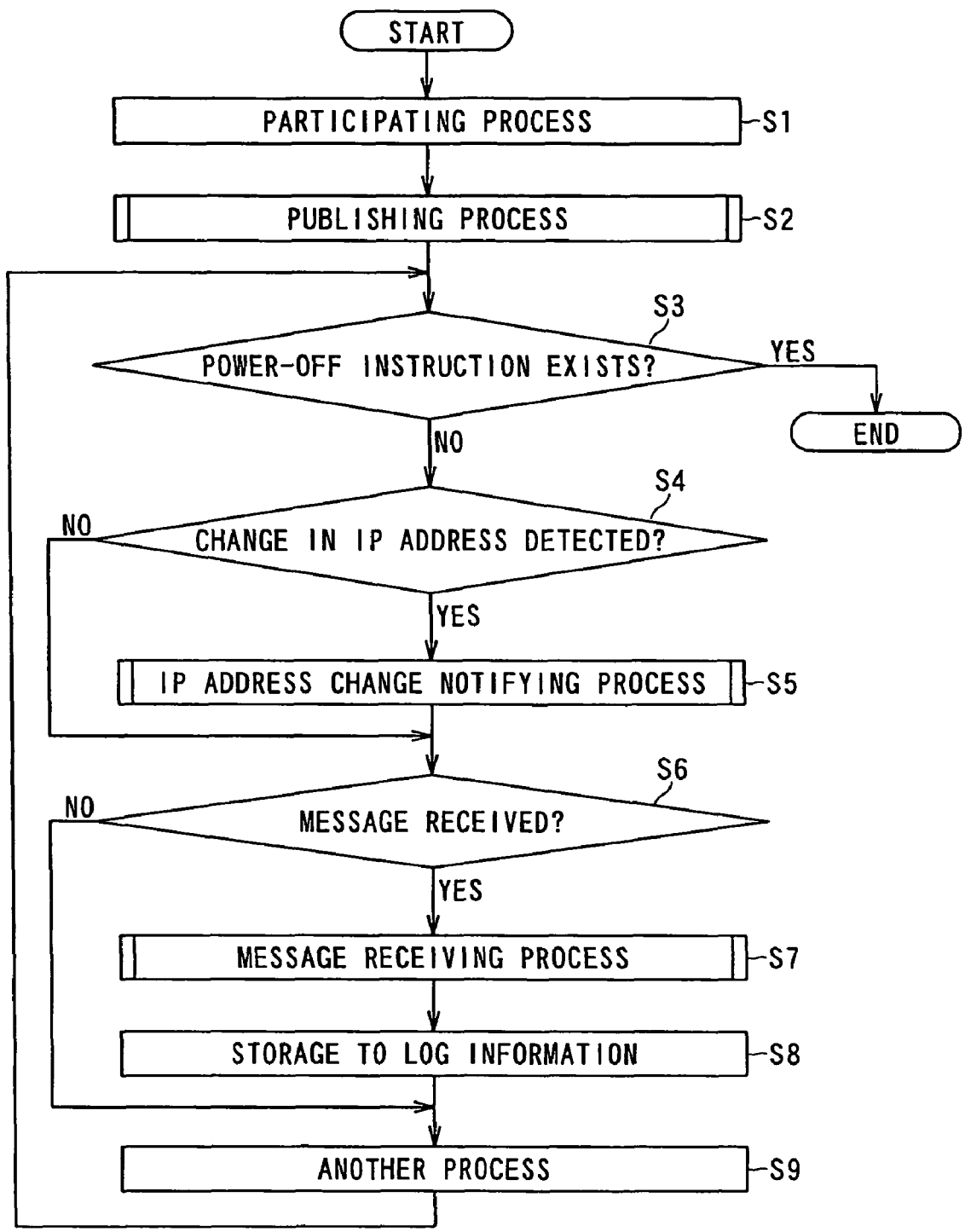
FIG. 6 is a flowchart showing a main process of a controller 11 in a node Nn.
Figure 7:
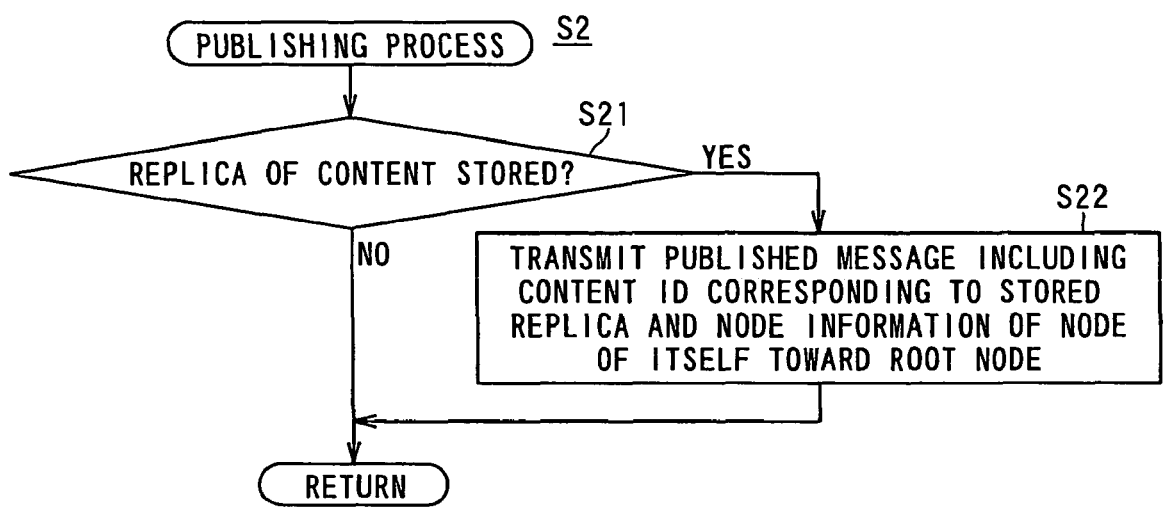
FIG. 7 is a flowchart showing the details of publishing process in step S2 and the like in FIG. 6.
Figure 9:
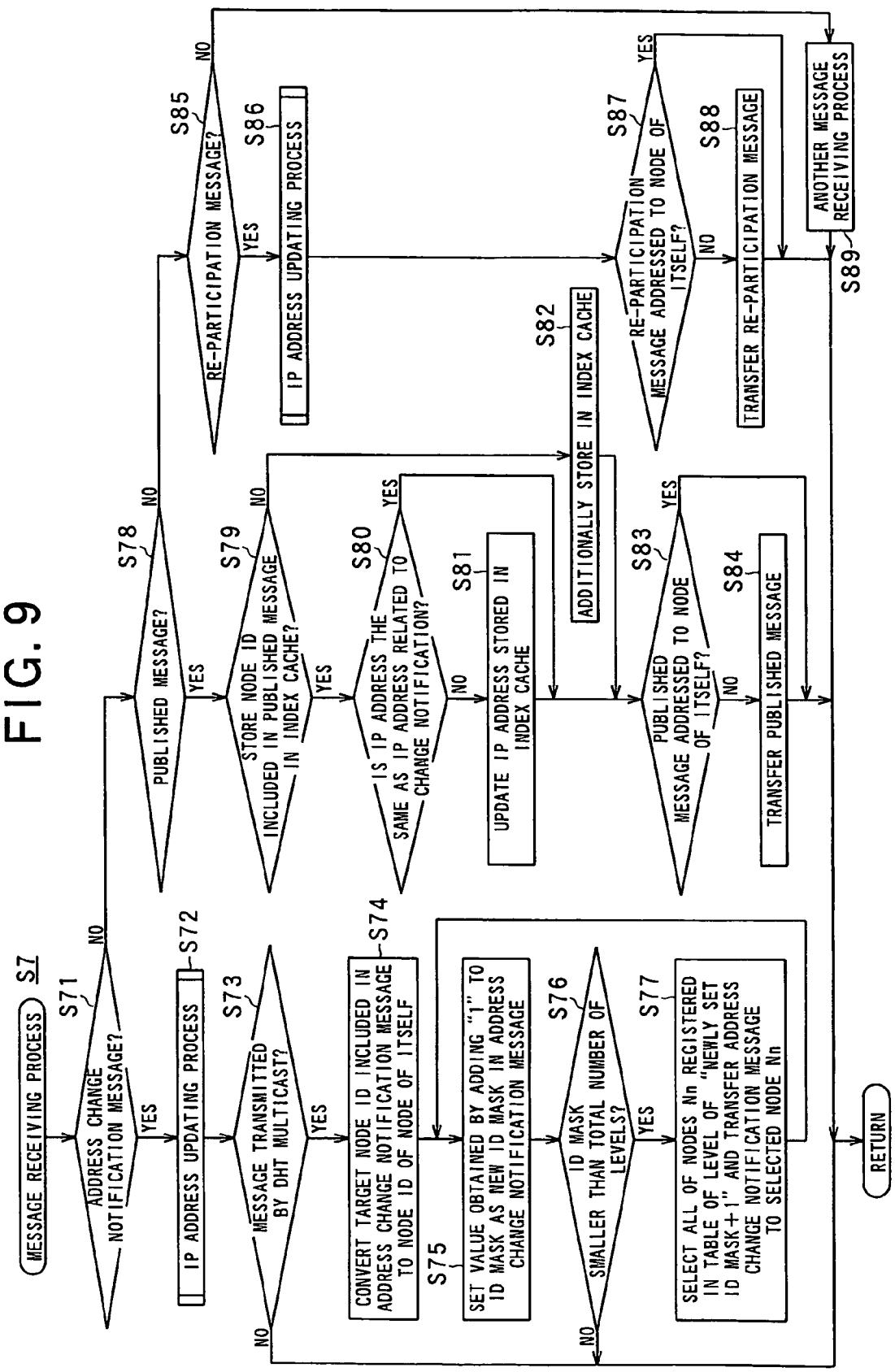
FIG. 9 is a flowchart showing the details of message receiving process in step S7 in FIG. 6.
Figure 10:
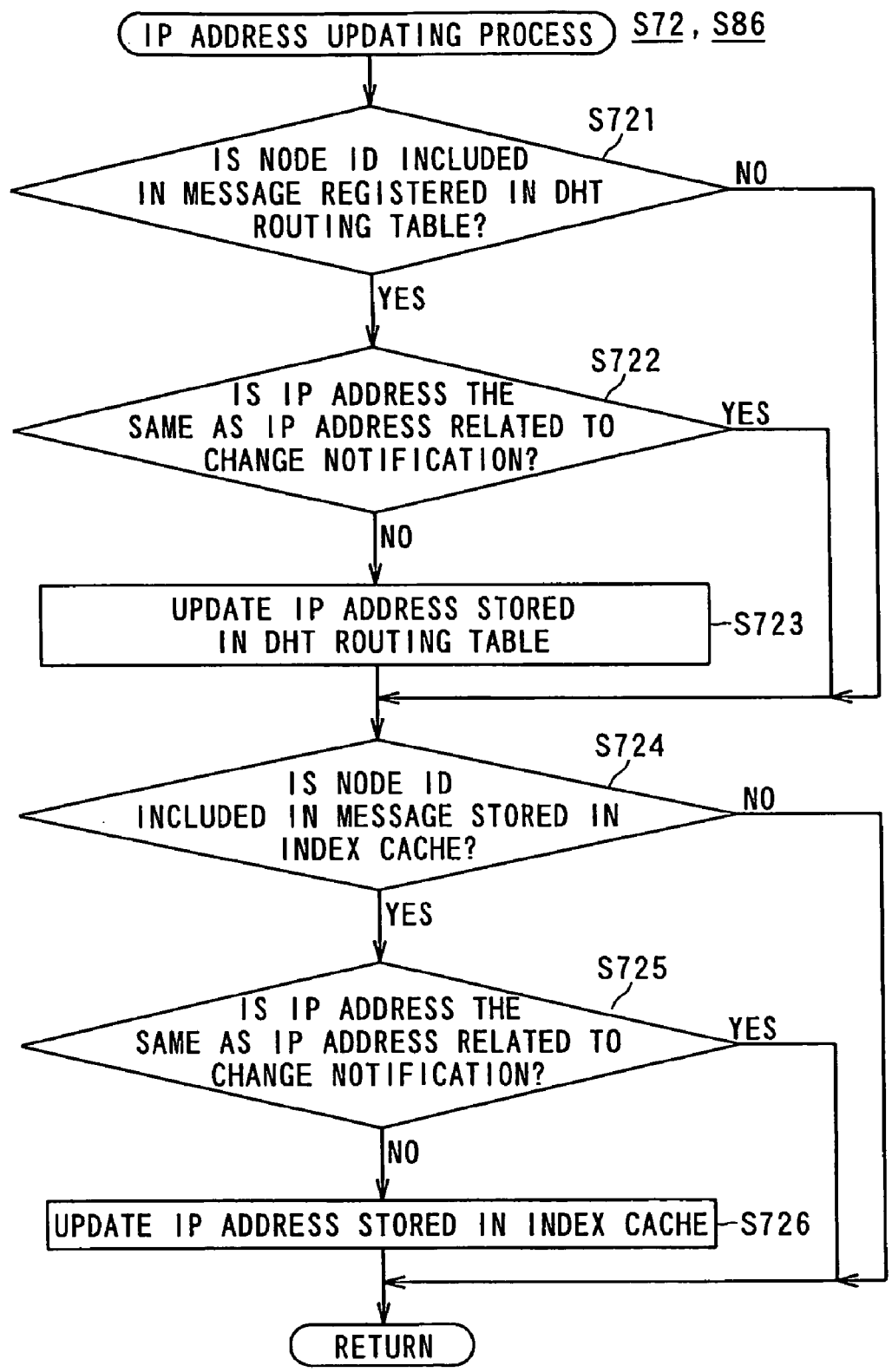
FIG. 10 is a flowchart showing the details of IP address updating process in steps S72 and S85 in FIG. 9.
Figure 11:
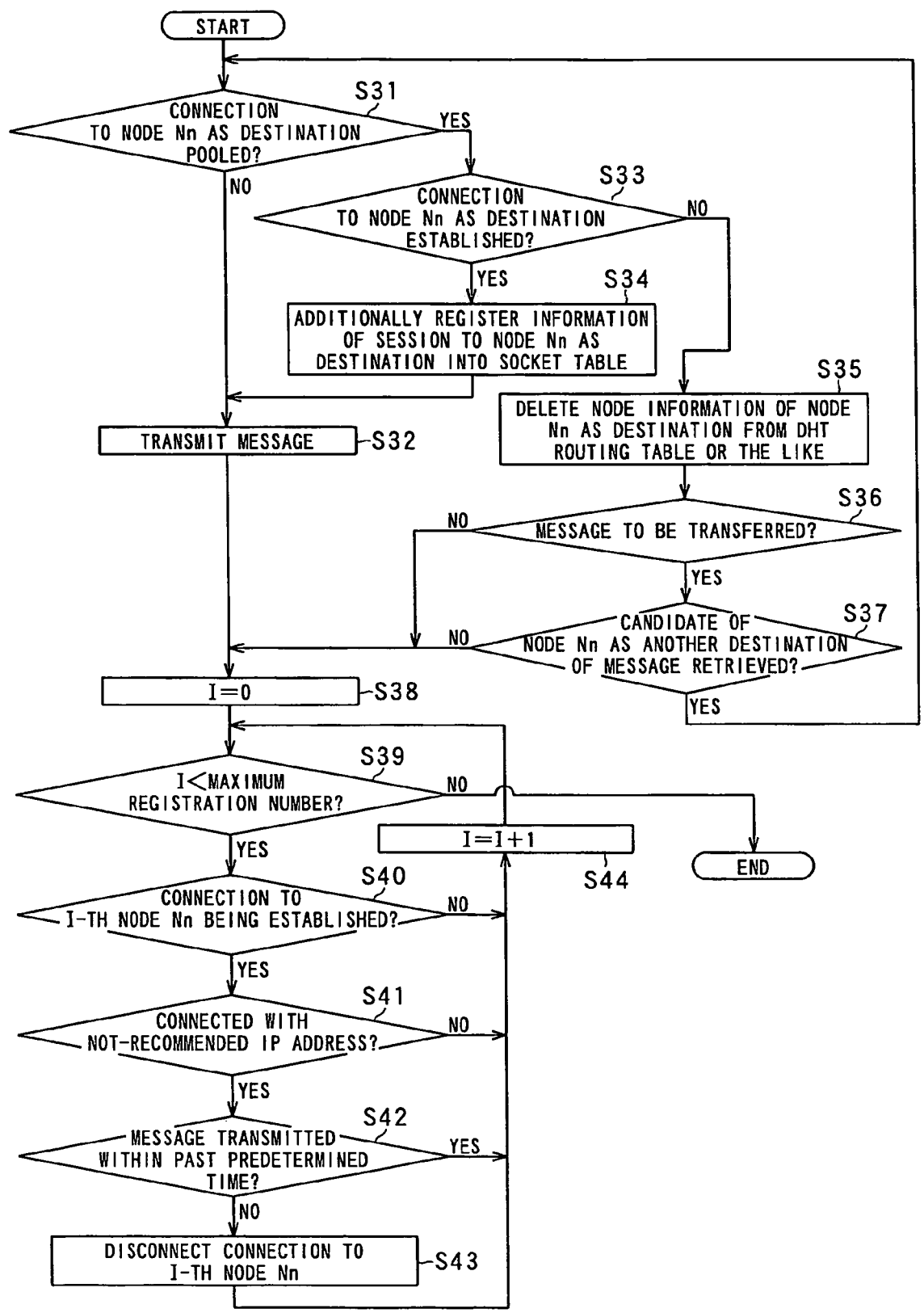
FIG. 11 is a flowchart showing the details of message transmitting process.

FIG. 6 is a flowchart showing the main process of the controller 11 in the node Nn. FIG. 7 is a flowchart showing the details of a publishing process in step S2 and the like shown in FIG. 6. FIGS. 8A to 8E are flowcharts showing the details of an IP address change notifying process in step S5 in FIG. 6. FIG. 9 is a flowchart showing the details of a message receiving process in step S7 in FIG. 6. FIG. 10 is a flowchart showing the details of an IP address updating process in steps S72 and S86 in FIG. 9. FIG. 11 is a flowchart showing the details of a message transmitting process.

The process shown in FIG. 6 is started when the power is turned on in the node Nn. First, the controller 11 performs a participating process (step S1). In the participating process, as described with reference to FIG. 4, the controller 11 is connected to a contact node via the network 8 and transmits a participation message to the contact node. When return messages sent from nodes Nn including the contact node are received, the controller 11 generates a DHT routing table using node information and the like included in the each return messages.

Subsequently, the controller 11 performs a publishing process (step S2). In the publishing process, as shown in FIG. 7, the controller 11 determines whether a replica of content is stored in the storage 12 or not (step S21). In the case where the replica is not stored (NO in step S21), the controller 11 returns to the process in FIG. 6. In the case where the replica is stored (YES in step S21), the controller 11 advances to step S22.

In step S22, the controller 11 transmits a published message including the content ID corresponding to the stored replica and node information of the node of itself toward the root node. Concretely, the controller 11 selects one node Nn from the DHT routing table on the basis of a result of comparison between the content ID and the node ID of another node Nn registered in the DHT routing table, for example, the node Nn having the node ID closest to the content ID. The controller 11 transmits the published message to the selected node Nn. In the case where replicas of a plural pieces of different content are stored, a published message is transmitted to a root node corresponding to the content ID of each of the content pieces.

Next, the controller 11 determines whether a power-off instruction is given or not (step S3). In the case where there is no power-off instruction (NO in step S3), the controller 11 advances to step S4. In the case where there is a power-off instruction (YES in step S3), a withdrawing process is performed and, after that, the process of FIG. 6 is finished. In the withdrawing process, a withdrawal notification message including the content ID corresponding to the stored replica and the node information of the node of itself is transmitted toward the root node. By the operation, in the root node which receives the withdrawal notification message and a cache node existing on the path of transferring the withdrawal notification message, the node information of the transmitter of the withdrawal notification message is deleted from the index information.

In step S4, the controller 11 determines whether a change in the IP address of the node of itself is detected or not. In the case where a change in the IP address is not detected (NO in step S4), the controller 11 advances to step S6. In the case where a change in the IP address is detected (YES in step S4), the controller 11 performs the IP address change notifying process (step S5). FIGS. 8A to 8E show examples 1 to 5, respectively, of the IP address change notifying process.

Figure 8A:
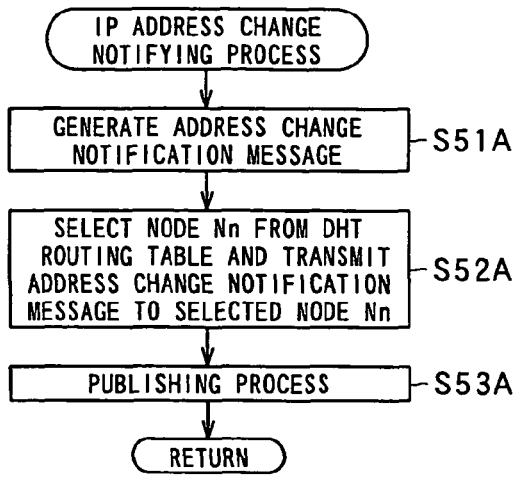
FIGS. 8A to 8E are flowcharts showing the details of IP address change notifying process in step S5 in FIG. 6.

Example 1 shown in FIG. 8A relates to an example using the DHT routing table. In this case, first, the controller 11 generates an address change notifying message including the changed IP address of the node of itself and the node ID of the node of itself (step S51A). Subsequently, the controller 11 selects all of the nodes Nn whose node information is registered in the DHT routing table and transmits the generated address change notification message to the each selected nodes Nn (step S52A). After that, the controller 11 performs the publishing process shown in FIG. 7 (step S53A). A published message transmitted in the step includes the changed IP address of the node and the node ID of the node.

Figure 8B:
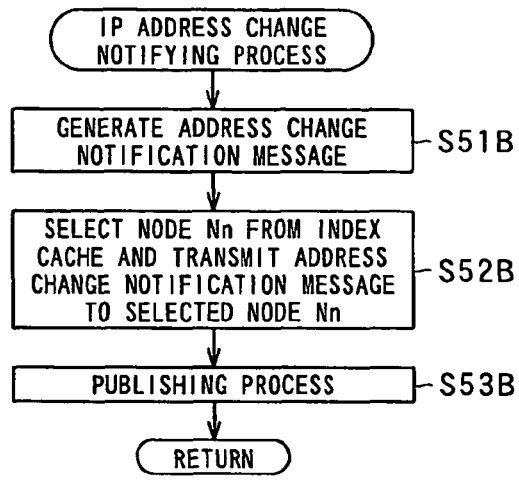

Example 2 shown in FIG. 8B is an example using an index cache. In this case, first, the controller 11 generates an address change notification message including the changed IP address of the node of itself and the node ID of the node of itself (step S51B). Subsequently, the controller 11 selects all of the nodes Nn whose IP addresses are stored in the index cache and transmits the generated address change notification message to the selected nodes Nn (step S52B). After that, the controller 11 performs the publishing process shown in FIG. 7 (step S53B). In the process shown in FIG. 8B, the process of step S52A shown in FIG. 8A may be performed. To a node Nn whose node information is stored in both of the DHT routing table and the index cache, the address change notification message is transmitted only once in the process.

Figure 8C:
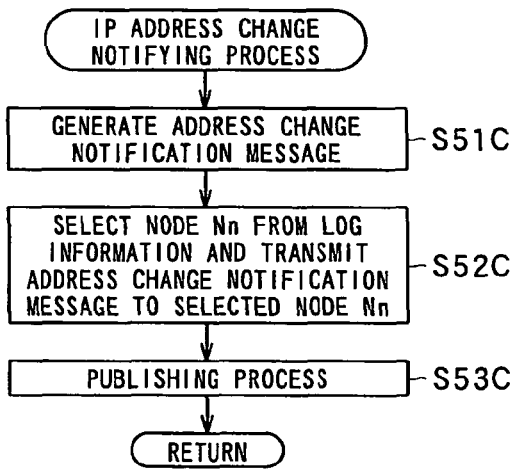

Example 3 shown in FIG. 8C is an example using log information. In this case, first, the controller 11 generates an address change notification message including the changed IP address of the node of itself and the node ID of the node of itself (step S51C). Subsequently, the controller 11 selects all of the nodes Nn whose IP addresses are stored in the log information and transmits the generated address change notification message to the each selected nodes Nn (step S52C). After that, the controller 11 performs the publishing process shown in FIG. 7 (step S53C).

Figure 8D:
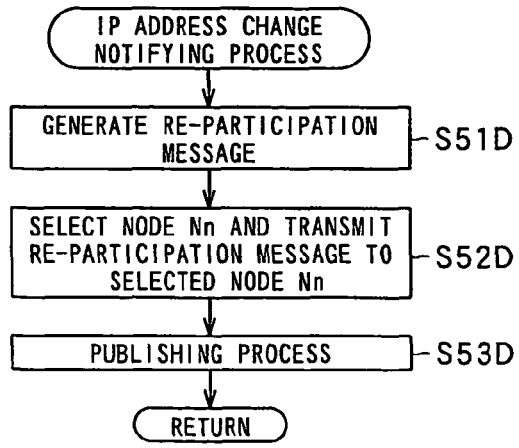

Example 4 shown in FIG. 8D is an example using triangle participation. In this case, first, the controller 11 generates a re-participation message including the changed IP address of the node of itself and the node ID of the node of itself (step S51D). Subsequently, the controller 11 selects one node Nn whose node information is stored in the DHT routing table, the index cache, and the like and transmits the generated re-participation message to the selected nodes Nn (step S52D). When a contact node is used as the selected node Nn, it is more effective for the reason that the re-participation message is transferred in the same transfer path as that of the participation message if there is no change in the data of the DHT routing table in a node Nn existing on the path of transferring the participation message by the participating process in the step S1. After that, the controller 11 performs the publishing process shown in FIG. 7 (step S53D).

Figure 8E:
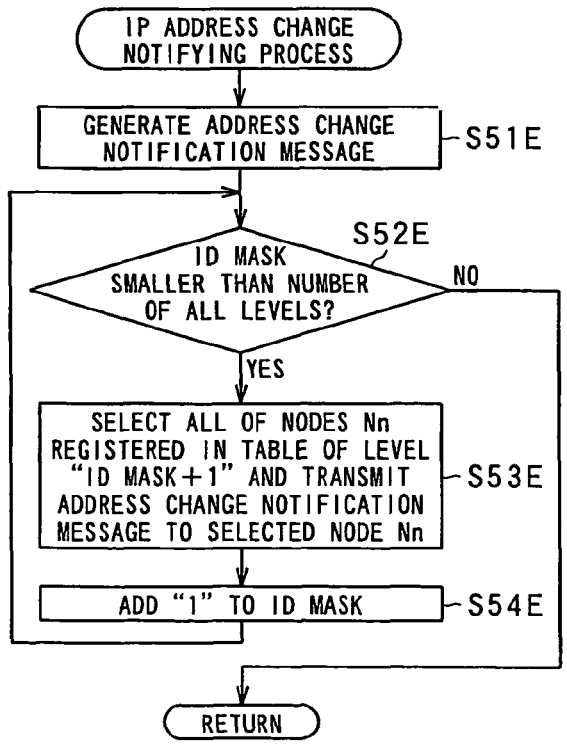

Example 5 shown in FIG. 8E is an example using DHT multicast. In this case, first, the controller 11 generates an address change notification message including the changed IP address of the node of itself, the node ID of the node of itself, and ID mask "0" (step S51E), and stores the message in the RAM. The node ID of the node of itself of the controller 11 is set as a target node ID.

Subsequently, the controller 11 determines whether the ID mask in the address change notification message is smaller than the total number of levels (total number of stages) of the DHT routing table or not (step S52E). In the case where the ID mask is smaller than the total number of levels (YES in step S52E), the controller 11 advances to step S53E. In the case where the ID mask is not smaller than the total number of levels, that is, in the case where the ID mask and the total number of levels match (NO in step S52E), the controller 11 finishes the process. For example, when the ID mask is "0", "0" is smaller than the total number of levels of "3" in the DHT routing table shown in FIG. 2, so that the controller 11 advances to step S53E.

In step S53E, the controller 11 selects all of nodes Nn whose node information is registered in the table at a level of "ID mask +1" (for example, level 1) in the DHT routing table, and transmits the generated address change notification message to the selected each nodes Nn.

Subsequently, the controller 11 sets a value obtained by adding "1" to the ID mask set in the address change notification message as a new ID mask in the address change notification message (step S54E), and returns to step S52E. The processes in the steps S53E and S54E are repeatedly executed until the ID mask matches the total number of levels in the DHT routing table in the step S52E, and the address change notification message is transmitted to all of the nodes Nn whose node information is registered in the DHT routing table. The address change notification message is transferred by the nodes Nn which have received the message (step S77 in FIG. 9) and spreads in the entire distributed storage system S. By the process, for example, the ID mask set in the address change notification message transmitted to the node Nn registered in the table of level 1 in the DHT routing table becomes "0". The ID mask set in the address change notification message transmitted to the node Nn registered in the table of level 2 in the DHT routing table becomes "1". That is, as the numerical number of the level increases, the value of the ID mask increases.

Returning to the process shown in FIG. 6 and, in step S6, the controller 11 determines whether a message is received or not. In the case where a message is not received (NO in step S6), the controller 11 advances to step S9 and performs the other processes. In the case where a message is received (YES in step S6), the message receiving process is performed (step S7). In the message receiving process, a process according to the type of the message received is performed. The type of the message is written in, for example, the header of each message.

In a message receiving process shown in FIG. 9, the controller 11 determines whether the received message is an address change notification message or not (step S71). In the case where the received message is the address change notification message (YES in step S71), the controller 11 advances to step S72. In the case where the received message is not the address change notification message (NO in step S71), the controller 11 advances to step S78.

In step S72, the controller 11 performs an IP address updating process. In the IP address updating process, as shown in FIG. 10, the controller 11 determines whether the node ID included in the received address change notification message (the node ID of the node Nn of the transmitter of the message) is registered in the DHT routing table or not (step S721). In the case where the node ID is registered in the DHT routing table (YES in step S721), the controller 11 advances to step S722. In the case where the node ID is not registered in the DHT routing table (NO in step S721), the controller 11 advances to step S724.

In step S722, the controller 11 determines whether the IP address registered in the DHT routing table so as to be associated with the node ID is the same as the IP address related to the change notification included in the received address change notification message or not. In the case where the IP addresses are the same (YES in step S722), the controller 11 advances to step S724. In the case where the IP addresses are different from each other (NO in step S722), the controller 11 advances to step S723.

In step S723, the controller 11 updates an IP address registered in the DHT routing table, which is associated with the same node ID and is the same as the IP address related to the change notification included in the address change notification message.

In step S724, the controller 11 determines whether the node ID included in the received address change notification message (the node ID of the node Nn as the transmitter of the message) is stored in the index cache or not. In the case where the node ID is stored in the index cache (YES in step S724), the controller 11 advances to step S725. In the case where the node ID is not stored in the index cache (NO in step S724), the controller 11 returns to the process shown in FIG. 9.

In step S725, the controller 11 determines whether the IP address stored in the index cache so as to be associated with the node ID is the same as the IP address related to the change notification included in the received address change notification message or not. In the case where the IP addresses are the same (YES in step S725), the controller 11 returns to the process shown in FIG. 9. In the case where the IP addresses are different from each other (NO in step S725), the controller 11 advances to step S726.

In step S726, the controller 11 updates the IP address stored in the index cache, which is associated with the same node ID as that of the IP address, with the IP address related to the change notification included in the address change notification message, and returns to the process shown in FIG. 9.

In step S73 shown in FIG. 9, the controller 11 determines whether the received address change notification message is the message transmitted by the DHT multicast (for example, on the basis of the ID mask) In the case where the message is a message transmitted by the DHT multicast (YES in step S73), the controller 11 advances to step S74. In the case where the message is not the message transmitted by the DHT multicast (NO in step S73), the controller 11 returns to the process shown in FIG. 6.

In step S74, the controller 11 converts the target node ID included in the received address change notification message to the node ID of the node of itself.

Subsequently, the controller 11 sets a value obtained by adding "1" to the ID mask set in the address change notification message as a new ID mask in the address change notification message (step S75).

The controller 11 determines whether the ID mask in the address change notification message is smaller than the total number of levels (the total number of stages) in the DHT routing table or not (step S76). In the case where the ID mask is smaller than the total number of levels (YES in step S76), the controller 11 advances to step S77. In the case where the ID mask is not smaller than the total number of levels, that is, in the case where they match (NO in step S76), the controller 11 returns to the process shown in FIG. 6.

In step S77, the controller 11 selects all of the nodes whose node information is registered in a table of level of "ID mask +1" (for example, level 2) newly set in step S75, in the DHT routing table, transfers the address change notification message in which the target node ID is converted and a new ID mask is set to the selected nodes Nn, and returns to the step S75.

In such a manner, the processes in the steps S75 and S77 are repeatedly executed until the ID mask matches the total number of levels in the DHT routing table in the step S76, and the address change notification message is transmitted to all of the nodes Nn whose node information is registered at levels lower than predetermined level (predetermined stage) in the nodes Nn whose node information is registered in the DHT routing table. The predetermined level corresponds to the level of "ID mask+1" at the time of reception of the address change notification message.

Next, in the step S78 shown in FIG. 9, the controller 11 determines whether the received message is a published message or not. In the case where the received message is a published message (YES in step S78), the controller 11 advances to step S79. In the case where the received message is not a published message (NO In step S78), the controller 11 advances to step S85.

In step S79, the controller 11 determines whether the node ID included in the received published message (the node ID of the node Nn as the transmitter of the message) is stored in the index cache or not. In the case where the node ID is stored in the index cache (YES in step S79), the controller 11 advances to step S80. In the case where the node ID is not stored in the index cache (NO in step S79), the controller 11 advances to step S82.

In step S80, the controller 11 determines whether the IP address stored in the index cache in association with the node ID is the same as the IP address related to the change notification included in the received published message or not. In the case where the IP addresses are the same (YES in step S80), the controller 11 advances to step S83. In the case where the IP addresses are different from each other (NO in step S80), the controller 11 advances to step S81.

In step S81, the controller 11 updates the IP address stored in the index cache in association with the same node ID as that of the IP address with the IP address related to the change notification included in the published message.

In step S82, the controller 11 additionally stores a set of the content ID included in the received published message and the node information as index information into the index cache.

In step S83, the controller 11 determines whether the received published message is addressed to the node of itself or not (that is, whether the node of the controller 11 is the root node of the content ID or not) on the basis of a result of comparison between the content ID included in the published message and the node ID of the node of itself and the node ID of another node Nn registered in the DHT routing table. In the case where the published message is addressed to the node of the controller 11, for example, in the case where the node Nn having the node ID closest to the content ID (for example, having larger number of matched upper bits) included in the published message is the node of the controller 11, the controller 11 returns to the process shown in FIG. 6. In the case where the published message is not addressed to the node of the controller 11, the controller 11 advances to step S84.

In step S84, the controller 11 selects one node Nn from the DHT routing table on the basis of the comparison result, for example, selects a node Nn having the node ID closest to the content ID, transfers the published message to the selected node Nn, and returns to the process shown in FIG. 6.

In step S85 shown in FIG. 9, the controller 11 determines whether the received message is a re-participation message or not. In the case where the received message is the re-participation message (YES in step S85), the controller 11 advances to step S86. In the case where the received message is not the re-participation message (NO in step S85), the controller 11 advances to step S89.

In step S86, the controller 11 performs the IP address updating process shown in FIG. 10.

Subsequently, the controller 11 determines whether the received re-participation message is addressed to the node of itself or not (that is, the node of the controller 11 is the root node having the node ID of the node Nn as the transmitter of the re-participation message) or not on the basis of a result of comparison between the node ID included in the re-participation message and the node ID of the node of the controller 11 and the node ID of another node Nn registered in the DHT routing table (step S87). In the case where the re-participation message is addressed to the node of the controller 11 (YES in step S87), for example, in the case where the node Nn having the node ID closest to the node ID included in the re-participation message (for example, having larger number of upper digits) is the node of the controller 11, the controller 11 returns to the process shown in FIG. 6. In the case where the re-participation message is not addressed to the node of the controller 11 (NO in step S87), the controller 11 advances to step S88.

In step S88, the controller 11 selects one node Nn from the DHT routing table on the basis of the comparison result, for example, the node Nn having the node ID closest to the node ID included in the re-participation message, transfers the re-participation message to the selected node Nn, and returns to the process shown in FIG. 6.

In step S89, a process according to another message (such as a participation message, a content location inquiry message, a content transmission request message, or the like) is performed.

In step S8 shown in FIG. 6, for example, with the IP address related to the change notification included in the received address change notification message, the IP address included in log information associated with the same node ID as that of the IP address is updated. Alternatively, a set of the IP address and the node ID included in the received participation message is newly added.

Next, the details of the message transmitting process performed in FIGS. 6 to 10 will be described with reference to FIG. 11.

The process shown in FIG. 11 is started in the case where a message to be transmitted (for example, the address change notification message or the like) and the node Nn as the destination of the message are determined. The controller 11 determines whether connection to the node Nn as the destination of the message is pooled or not (step S31).

Connection (session) to the node Nn as the destination is established by a connection procedure called three-way handshake (in the case of using SSL (Secure Socket Layer), authentication is performed), in the distributed storage system S, connection is established to many nodes Nn. Consequently, when the handshake is performed each time a message is transferred, it takes time for the transfer. Therefore, once handshake is performed, connection to a node Nn which is frequently connected is not disconnected, and the session information is registered and held in a socket table (this is called socket pooling). For example, in a socket table, about 50 pieces of session information can be registered at the maximum (about 50 sockets can be pooled). The session information includes, for example, node information of the node of itself, node information of a connection party, and a socket identifier. New connection to a node Nn which is not socket-pooled is established by handshake after connection to a node Nn which is least used in the socket pool is disconnected.

In the case where connection to the node Nn as the destination of the message is pooled in step S31 (YES in step S31), the controller 11 transmits the message (packet) to the node Nn as the destination via the communication unit 19 (step S32).

On the other hand, in the case where connection to the node Nn as the destination of the message is not pooled (NO in step S31), the controller 11 tries to establish connection to the node Nn as the destination by the handshake using the IP address of the node Nn as the destination and the port number as the destination IP address and the destination port number. In the case where connection to the node Nn as the destination can be established (YES in step S33), the controller 11 additionally registers the information of the session to the node Nn as the destination into the socket table (in the case where the number of registrations reaches the maximum registration number, for example, the oldest session information is deleted and the session information is newly registered) (step S34), and the process in the step S32 is performed. On the other hand, in the case where the connection to the node Nn as the destination cannot be established (NO in step S33), the controller 11 deletes the node information of the node Nn as the destination from the DHT routing table or the like (step S35). Subsequently, the controller 11 determines whether the message to be transmitted is a message to be transferred to another node Nn (for example, a published message) or not (step S36). In the case where the message is a message to be transferred (YES in step S36), the controller 11 advances to step S37. In the case where the message is not a message to be transferred (NO in step S36), the controller 11 advances to step S38.

In step S37, the controller 11 retrieves a candidate of the node Nn as another destination (transfer destination) of the message from, for example, the DHT routing table. In the case where the controller 11 can retrieve a candidate (YES in step S37), the controller 11 returns to step S31 and performs process similar to the above-described process on the node Nn which can be retrieved. On the other hand, in the case where the controller 11 cannot retrieve a candidate (NO in step S37), the controller 11 advances to step S38.

Steps S38 to S44 relate to socket pool cleaning process. First, the controller 11 sets variable I to "0" (step S38) and determines whether the variable I is smaller than the maximum registration number (for example, 50) in the socket table or not (step S39). In the case where I is smaller than the maximum registration number (for example, 50) in the socket table (YES in step S39), the controller 11 advances to step S40. In the case where I is not smaller than the maximum registration number (for example, 50) to the socket table (NO in step S39), the process is finished.

In step S40, the controller 11 determines whether connection to the node Nn registered in the I-th order in the socket table is established or not. In the case where the connection is established (YES in step S40), the controller 11 advances to step S41. In the case where the connection is not established (NO in step S40), the controller 11 advances to step S44.

In step S41, the controller 11 determines whether connection to the node Nn registered in the I-th order is established with a not-recommended IP address (the IP address of the node of itself) or not. In the case where the connection is established with the not-recommended IP address (YES in step S41), the controller 11 advances to step S42. In the case where the connection is established with a recommended IP address (NO in step S41), the controller 11 advances to step S44.

The not-recommended IP address is set in consideration of the case of IPv6. In the case of IPv6, predetermined time since allocation of an IP address is a recommended period. After the recommended period, the IP address becomes non-recommended one.

In step S42, the controller 11 determines whether or not a message is transmitted to the node Nn registered in the I-th order within past predetermined time (for example, 10 minutes) before the present time. In the case where a message is transmitted (YES in step S42), the controller 11 advances to step S44. In the case where a message is not transmitted (NO in step S42), the controller 11 advances to step S43.

In step S43, the controller 11 disconnects the connection to the node Nn registered in the I-th order, and advances to step S44.

In step S44, the controller 11 increments "I" by one, returns to step S39, and performs process similar to the above on the next node Nn.

As described above, in the foregoing embodiment, in the case where each of nodes Nn detect a change in the IP address of itself, the each of nodes Nn select another node Nn from the DHT routing table, the index cache, or the like, and transmits the address change notification message to the selected node Nn to notify of the change in the IP address and update the IP address. With the configuration, information transmission among nodes Nn (for example, routing of a message using the DHT routing table) can be prevented from being disturbed even when the IP address is changed.

By sending an IP address change notification in a transfer path similar to that of a published message, the node can more effectively notify nodes Nn which are expected to store the IP address of the node itself of a change in the IP address in a transfer path of a published message to the root node.

With the configuration of sending an IP address change notification in a transfer path similar to that of a participation message, the node can more effectively notify nodes Nn which are expected to store the IP address of the node itself of a change in the IP address in a transfer path of a re-participation message to the root node.

With the configuration of sending an IP address change notification by DHT multicast, a change in an IP address can be notified to all of nodes participating in the distributed storage system S.

In the foregoing embodiment, an IP address is employed as an example of address information. The invention can be also applied to the case of a change in a listen port.

The distributed storage system S in the embodiment has been described on precondition that it is formed by an algorithm using a DHT, however, the present invention is not limited to the embodiment.

The present invention is not confined to the configuration listed in the foregoing embodiments, but it is easily understood that the person skilled in the art can modify such configurations into various other modes, within the scope of the present invention described in the claims.

The invention claimed is:

1. A distributed storage system comprising an overlay network which is formed by participation of a plurality of node devices connected to a network, in which replica data of a plurality of contents is stored in a plurality of the node devices in a distributed manner and the replica data can be transmitted and received among the node devices, wherein a transmitting node device comprises:
a first storing unit configured to store a first routing table used for transferring a message among the plurality of node devices participating in the overlay network, the first routing table registering address information and node identification information of a plurality of first specific node devices participating in the overlay network, as transfer candidates of transfer destinations of the message;
a detecting unit configured to detect a change in address information of the transmitting node device;
a first selecting unit configured to select at least one node device from the first routing table, if a change in address information is detected by the detecting unit; and
a notifying unit configured to transmit an address change/notification message to the node device selected by the first selecting unit via the network, based on address information of the selected node device, the address change notification message including the changed address information and node identification information of the transmitting node device, and wherein a receiving node device, which receives the address change notification message, comprises:
a second storing unit configured to store a second routing table used for transferring a message among the plurality of node devices participating in the overlay network, the second routing table registering address information and node identification information of a plurality of second specific node devices participating in the overlay network, as transfer candidates of transfer destinations of the message;
an updating unit configured to update the address information stored in the second storing unit with the address information included in the received message, if the node identification information included in the received message has been already stored in the second storing unit and the address information stored in the second storing unit in association with the already stored node identification information is different from the address information included in the received message;
a second selecting unit configured to select one node device from the second routing table, based on a result of comparison between the node identification information included in the received message and node identification information registered in the second routing table; and
a message transfer unit configured to transfer the received message to the node device selected by the second selecting unit via the network, based on the address information of the selected node device.

2. The distributed storage system according to claim 1, wherein:
the first routing table separately registers the address information in a plurality of stages from an upper stage to a lower stage;
the first selecting unit selects the node device from the first specific node device whose the address information is registered in a predetermined stage of the first routing table and the first specific node device whose the address information is registered in a stage lower than the predetermined stage;
the notifying unit transmits the address change notification message to the node device selected by the first selecting unit;
the second routing table separately registers the address information in a plurality of stages from an upper stage to a lower stage;
the second selecting unit selects the node device from the second specific node device whose the address information is registered in a lower stage of the second routing table, wherein the lower stage is lower than the predetermined stage of the first routing table; and
the message transfer unit transfers the address change notification message to the node device selected by the second selecting unit via the network.

3. The distributed storage system according to claim 1, wherein:
the first storing unit stores index information including a set of content identification information of the content and address information of a node device which stores replica data of the content;
the first selecting unit selects a node device whose address information is included in the index information; and
the notifying unit transmits the address change notification message to the node device selected by the first selecting unit, the address change notification message including the changed address information and node identification information of the transmitting node unit.

4. The distributed storage system according to claim 1, wherein the transmitting node device further comprises:
a message receiving unit configured to receive a message which one of the plurality of the node devices sends, the message including address information of a node device which has transmitted the message;
wherein the first storing unit stores log information including address information of a node device which transmitted the message received by the message receiving unit;
the first selecting unit selects a node device whose address information is included in the log information; and
the notifying unit transmits the address change notification message to the node device selected by the first selecting unit, the address change notification message including the changed address information and node identification information of the transmitting node device.

5. The distributed storage system according to claim 1, wherein:
the first storing unit stores address information of a node device as a destination of a participation message to be transmitted at the time of participation in the distributed storage system;
the first selecting unit selects a node device as a destination of the participation message; and
the notifying unit transmits the address change notification message to the node device selected by the first selecting unit, the address change notification message including the changed address information and node identification information of the transmitting node device.

6. The distributed storage system according to claim 1, wherein:
the first selecting unit selects one node device based on a result of comparison between content identification information corresponding to the replica data stored in the transmitting node device and node identification information of node devices whose address information is registered in the first routing table;
the notifying unit transmits the address change notification message to the node device selected by the first selecting unit via the network, based on the address information of the selected node device, the address change notification message including the changed address information, the content identification information, and node identification information of the transmitting node device;
the receiving node device, which receives the address change notification message, further comprises a third selecting unit configured to determine whether the received address change notification message is addressed to the receiving node device or not, based on a result of comparison between content identification information included in the address change notification message and node identification information of the receiving node device or node identification information registered in the second routing table, and, configured to select one node device from the second routing table based on the comparison result, if the message is not addressed to the receiving node device; and
the message transfer unit transfers the address change notification message to the node device selected by the third selecting unit via the network, based on the address information of the selected node device.

7. The distributed storage system according to claim 1, wherein:
the notifying unit transmits the address change notification message to the node device selected by the first selecting unit, the address change notification message including level information indicative of a stage of the second routing table;
the second routing table separately registers the address information in a plurality of stages from an upper stage to a lower stage;
the second selecting unit selects the node device from the second specific node device whose the address information is registered in a lower stage of the second routing table, wherein the lower stage is lower than the stage indicated in the received level information; and
the message transfer unit transfers the address change notification message to the node device selected by the second selecting unit via the network.

8. A communication node device in a distributed storage system comprising an overlay network which is formed by participation of a plurality of node devices connected to a network, in which replica data of a plurality of contents is stored in a plurality of the node devices in a distributed manner, and the replica data can be transmitted and received among the node devices, comprising:
a storing unit configured to store a routing table used for transferring a message among the plurality of node devices participating in the overlay network, the routing table registering address information and node identification information of specific node devices participating in the overlay network, as transfer candidates of transfer destinations of the message;
a detecting unit configured to detect a change in address information of the communication node device;
a first selecting unit configured to select at least one node device from the routing table, if a change in address information is detected by the detecting unit;
an notifying unit configured to transmit an address change notification message to the node device selected by the first selecting unit via the network, based on address information of the selected node device, the address change notification message including the changed address information and node identification information of the communication node device;
an updating unit configured to update the address information stored in the storing unit with the address information included in an address change notification message received from another node device, if the node identification information included in the message received from the other node device has been already stored in the storing unit and the address information stored in the storing unit in association with the already stored node identification information is different from the address information included in the message received from the other node device;
a second selecting unit configured to select one node device from the routing table, based on a result of comparison between the node identification information included in the received message and node identification information registered in the routing table; and
a message transfer unit configured to transfer the received message to the node device selected by the second selecting unit via the network, based on the address information of the selected node device.

9. An address information change notifying method in a distributed storage system comprising an overlay network which is formed by participation of a plurality of node devices connected to a network, in which replica data of a plurality of contents is stored in a plurality of node devices in a distributed manner, and the replica data can be transmitted and received among the node devices, wherein the distributed storage system comprises a first node device and a second node device, the first node device comprises a first storing unit configured to store a first routing table used for transferring a message among the plurality of node devices participating in the overlay network, the first routing table registering address information and node identification information of a plurality of first specific node devices participating in the overlay network, as transfer candidates of transfer destinations of the message, and the second node device comprises a second storing unit configured to store a second routing table used for transferring a message among the plurality of node devices participating in the overlay network, the second routing table registering address information and node identification information of a plurality of second specific node devices participating in the overlay network, as transfer candidates of transfer destinations of the message, the method comprising:

detecting a change in address information of the first node device by the first node device;

selecting at least one node device from the first routing table by the first node device, if a change in address information is detected;

transmitting an address change notification message to the selected node device via the network by the first node device, based on address information of the selected node device, the address change notification message including the changed address information and node identification information of the first node device;

receiving the address change notification message sent from the first device by the second node device;

updating the address information stored in the second storing unit with the address information included in the received message by the second node device, if the node identification information included in the received message has been already stored in the second storing unit and address information stored in the second storing unit in association with the already stored node identification information is different from the address information included in the received message;

selecting one node device from the second routing table by the second node device, based on a result of comparison between the node identification information included in the received message and node identification information registered in the second routing table; and transferring the received message to the selected node device via the network by the second node device, based on the address information of the selected node device.

10. A non-transitory computer-readable recording medium recording a node processing program to be performed in a communication node device in a distributed storage system comprising an overlay network which is formed by participation of a plurality of node devices connected to a network, in which replica data of a plurality of contents is stored in a plurality of the node devices in a distributed manner and the replica data can be transmitted and received among the node devices, the node processing program comprising:

detecting a change in address information of the communication node device which comprises a storing unit configured to store a routing table used for transferring a message among the plurality of node devices participating in the overlay network, the routing table registering address information and node identification information of specific node devices participating in the overlay network, as transfer candidates of transfer destinations of the message;

selecting at least one node device from the routing table, if a change in address information is detected;

transmitting an address change notification message to the selected node device via the network, based on address information of the selected node device, the address change notification message including the changed address information and node identification information of the communication node device;

updating the address information stored in the storing unit with the address information included in an address change notification message received from another node device, if the node identification information included in the received message has been already stored in the storing unit and the address information stored in the storing unit in association with the already stored node identification information is different from the address information included in the received message;

selecting one node device as transferring destination from the routing table, based on a result of comparison between the node identification information included in the received message and node identification information registered in the routing table; and transferring the received message to the node device selected as transferring destination via the network, based on the address information of the selected node device.

\* \* \* \* \*